(12) United States Patent
Crowley

(10) Patent No.: US 6,243,986 B1
(45) Date of Patent: Jun. 12, 2001

(54) PLANT CARE SYSTEM

(76) Inventor: Gerald J. Crowley, R.D. #4 Box 553, Hil Church R.D., Boyertown, PA (US) 19512

( * ) Notice: Subject to any disclaimer, the term of this patent is extended or adjusted under 35 U.S.C. 154(b) by 0 days.

(21) Appl. No.: 09/413,247

(22) Filed: Oct. 7, 1999

(51) Int. Cl.$^7$ .................................................. A01G 29/00
(52) U.S. Cl. ................................................................ 47/48.5
(58) Field of Search ............................ 47/48.5; 239/276; 137/78.3

(56) References Cited

U.S. PATENT DOCUMENTS

| 2,595,782 | 5/1952 | Epstein | 47/48.5 |
|---|---|---|---|
| 3,112,883 | * 12/1963 | Blanchard | 239/276 |
| 3,345,774 | * 10/1967 | Delbuguet | 47/48.5 |
| 3,821,863 | * 7/1974 | Chan | 47/48.5 |
| 4,745,706 | 5/1988 | Muza et al. | 47/47 |
| 4,970,823 | 11/1990 | Chen et al. | 47/48.5 |
| 5,172,515 | * 12/1992 | Lapshansky et al. | 47/48.5 |
| 5,259,142 | 11/1993 | Sax | 47/48.5 |
| 5,279,073 | 1/1994 | Czebieniak et al. | 47/48.5 |
| 5,618,000 | 4/1997 | Lantzy et al. | 239/276 |
| 5,836,106 | * 11/1998 | Alex | 47/48.5 |
| 5,881,495 | * 4/1999 | Clark | 47/48.5 |
| 5,896,700 | * 4/1999 | McGough | 47/48.5 |
| 5,924,240 | 7/1999 | Harrison | 47/48.5 |
| 6,112,456 | * 9/2000 | Rummins | 47/48.5 |
| 6,128,856 | * 10/2000 | Doan | 47/48.5 |

FOREIGN PATENT DOCUMENTS

| 622630 | 6/1961 | (CA) . |
|---|---|---|
| 2673356 | 9/1992 | (FR) . |
| 2179834 | 3/1987 | (GB) . |
| 2249463 | 5/1992 | (GB) . |

* cited by examiner

Primary Examiner—Charles T. Jordan
Assistant Examiner—Francis T. Palo
(74) Attorney, Agent, or Firm—Richard C. Litman

(57) ABSTRACT

A plant care system comprising a root feeding spike gravity fed by either a line from a reservoir or by individual economical water bottles. Water, per se, or with additives such as fertilizer and pesticide are fed by gravity to the plant roots. A kit contains the feeding spike with a valved cover, a tapper, and feeding lines.

7 Claims, 5 Drawing Sheets

PLANT CARE SYSTEM

BACKGROUND OF THE INVENTION

1. Field of the Invention

The present invention relates generally to a system for watering ground plants. More specifically, the invention is a plant watering system wherein water is directed into the ground to the roots of plants grown in rows without losses due to water runoff or evaporation; the invention includes perforated spikes fed by either individual water bottles or a piped watering system gravity fed by a container.

2. Description of the Related Art

The art of interest describes various watering devices, but none discloses the present invention of a watering stake or spike which can be individually supplied with a bottled solution or alternatively by a plurality of watering stakes by conduits supplied from a central water supply. When the ground is hard, watering for plants (potted or not), shrubbery and trees does not penetrate to the roots, and studies have shown at least 50% of the water from a garden hose evaporates or drains off. When granular fertilizer or pesticide for fire ants, ground hornets and moles is used, the wind and runoff will minimize penetration. Another advantage of the invention is that it permits unattended root watering (e.g., while one is on vacation). This system will maximize the penetration of the added water, per se, or contained additives such as fertilizer and pesticide to the plant roots at a controlled rate. This invention is environmentally friendly in minimizing the run-off of broadcasted fertilizer and pesticide.

The relevant art will be discussed in the order of perceived relevance to the present invention.

U.S. Pat. No. 5,259,142 issued on Nov. 9, 1993, to Stephen H. Sax describes a plant irrigation device comprising a plastic, bottom-vented, transparent, cylindrical bottle containing a brightly colored plastic ball (level indicator) and having a threaded cap with a spout having a single orifice. A plastic filter and rubber gasket are incorporated in the cap. The bottle containing 16 ounces of water or a liquid fertilizer solution is inverted over a plastic tube with a square cross-section is inserted in the soil of a potted plant. The water supply lasts two weeks. The device is distinguishable for being limited to a potted plant and having a vented bottle with a level indicating ball and a necessary filter. There is neither a suggestion or teaching of converting this device to connect the plastic feeding tube with the bottle or to form a multiple bottle system.

U.S. Pat. No. 4,745,706 issued on May 24, 1988, to Robert Muza et al. describes a plant watering and feeding stake combination device comprising a cylindrical tubular stake having a snap-on cap on the open top end, longitudinal opposing grooves on the outside surface for attaching slidable plant supporting strap assemblies, and a foot depressor for anchoring the pointed and apertured bottom end in the ground. The stake is filled with liquid fertilizer for feeding the plant roots. The device is distinguishable for its function to support a plant, an integrated foot depressor, and must be filled more frequently due to the plurality of apertures in the bottom portion.

U.S. Pat. No. 5,618,000 issued on Apr. 8, 1997, to John P. Lantzy et al. describes a root watering system requiring a valved pressurized water supply, i.e., faucet, for feeding water from a spray nozzle inserted and threaded in the top receptacle of a 3–3.5 foot polyvinyl chloride tube. The tube has a foot-operable pedal with a reinforcement rib below and a grooved tread upper surface for forcing the tube into the ground. Below the pedal is a short cigar-shaped end having a slot for dispersal of the water and a V-shaped deflector element. The device is distinguishable for requiring a pedal, a deflector and a pressurized water supply.

U.S. Pat. No. 5,924,240 issued on Jul. 20, 1999, to Mark R. Harrison describes a metering device to water and fertilize plants. A cylindrical tube made of plastic (polyvinyl chloride) or metal (aluminum), a foot long and 1.5 inches in outside diameter is capped at its bottom and threaded into a funnel on top. Only two holes having a diameter of 5/64 inch are positioned on one side of the tube. A 2–3 liter bottle of water and fertilizer is inverted and threaded into the funnel. When the bottle is not used, a threaded or unthreaded cap is used to cover the funnel. The metering device is distinguishable for its required funnel and only two apertures on one side of the tube.

U.S. Pat. No. 5,896,700 issued on Apr. 27, 1999, to Charles B. McGough describes a watering device having a capacity of 16 or 32 ounces for small plants or small indoor trees which will water a 10 inch diameter pot for two weeks. The water reservoir bottle has a threaded exit neck and a funnel-shaped top made of high density polyethylene. The bottle is threaded into a base assembly having a four-layered replaceable flow control wafer made from an O-ring, a plastic disk with an adhesive bottom surface, at least one layer of filter paper disks, and another plastic disk with an adhesive top surface. The base assembly has a raised compression ring internally and an external spike with an outlet plenum and a cruciform-shaped cross-section. The water flows from the bottle through the flow control wafer to the outlet plenum and into the soil. The watering device is distinguishable for its vented bottle and required four-layered replaceable flow control wafer.

U.S. Pat. No. 5,279,073 issued on Jan. 18, 1994, to Adolph S. Czebieniak describes a water or fertilizer feeding vine stake having nodules and tying cords on one side, two water or fertilizer adding apertures in the middle, and a necked down portion having a series of outlet holes along one side and ending in a tapered point. The vine stake feeder is distinguishable for its limitation to liquid adding apertures, nodules, and tying cords.

U.S. Pat. No. 5,806,240 issued on Sep. 15, 1998, to Pierre Racine describes a system for supplying dripping water to plant growing media by stacking transparent cylindrical tube sections on a support having two wing-shaped stabilizers, and a U-shaped pointed bottom stake. The base support contains a plastic outlet tube extending out on the soil surface and a flow adjustment screw. The system is distinguishable for surface feeding and a screw for adjustment of water flow.

U.S. Pat. No. 4,970,823 issued on Nov. 20, 1990, to Yuan-Yi Chen et al. describes a polyester plant nursery bottle water feeder having milliliter indicia on three sides. A threaded spike cap has a solid spike and a heat treated polyester wick 1/8–3/16 in. wide square cross-section inserted in the cap for capillary dripping of water into the soil. The water feeder bottle device is distinguishable for its required wick and solid spike.

U.S. Pat. No. 2,595,782 issued on May 6, 1952, to Max Epstein describes a plant medium watering device comprising a transparent reservoir tub having a plug member with openings threaded into a tripod base having cooperating passageways which open out above the soil. The device is distinguishable for having a tripod base and openings for water distribution above the soil.

U.K. Patent Application No. 2,179,834 published on Mar. 18, 1987, for John Andrews describes a plastic plant watering device having a mesh covered water bowl through which a plastic stake having support arms and an inner water distribution groove opening at the pointed end below ground level. The bowl has a bottom orifice which cooperates with the groove upon rotating the bowl. FIG. 2 describes a conduit with a series of large holes alternating with small orifices which feed a line of watering devices, but can be plugged. The device and conduit service are distinguishable for the mesh covered devices and the large holes in the conduit.

U.K. Patent Application No. 2,249,463 published on May 5, 1992, for Audrey J. Hilton describes a device for irrigating plant roots. A tube having an inner filter lining of non-woven felt-like synthetic fibers and either round or slotted apertures proximate the closed flat bottom is buried in the soil. A loose removable bowl covers the top. The device is distinguishable for its blunt end and filter lining.

Canada Patent Application No. 622,630 published on Jun. 27, 1961, for Walter N. Shepherd describes an apparatus for improving the water receiving and retaining characteristics of land comprising a perforated tube filled with sponge inserted into the ground up to a top flange which supports sponge layers covered by a rectangular wire mesh frame. The apparatus is distinguishable for its sponge filled spike and head.

France Patent Application No. 2,673,356 published on Sep. 4, 1992, for Mauro Stroppa as best understood describes an irrigation device for potted plants comprising a flanged conical spike having several large bottom apertures and a small upper protuberance. A stopper above the peripheral flange with another frictional protuberance supports a bottle of water. The device is distinguishable for its unitary spike.

None of the above inventions and patents, taken either singularly or in combination, is seen to describe the instant invention as claimed. Thus, a plant care system solving the aforementioned problems of watering, fertilizing and/or adding pesticide to the plant roots is desired.

SUMMARY OF THE INVENTION

The invention is a versatile combination plant care system including a spike element with an integral upright internally-threaded cup for threadedly securing a water or water/fertilizer supply thereon, e.g., an inverted bottle. The bottle may be a conventional soda plastic bottle. The spike may have a removable tapper element for assisting hammering the spike into the ground without harming the spike, particularly the water passageway through the spike. A plurality of spikes may be ganged together and fed from a common source, e.g., a plastic can or bag filled with water or a water/fertilizer combination.

Accordingly, it is a principal object of the invention to provide a system of watering plant roots with or without fertilizer or pesticide additives.

It is another object of the invention to provide a first embodiment of a plant watering system utilizing a line of watering spikes gravity fed by a central container.

It is a further object of the invention to provide a second embodiment of a plant watering system utilizing individual spikes with attached conventional water bottles.

Still another object of the invention is to provide a kit including the spike, a valved cap and a tapper for inserting the spike in the ground.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
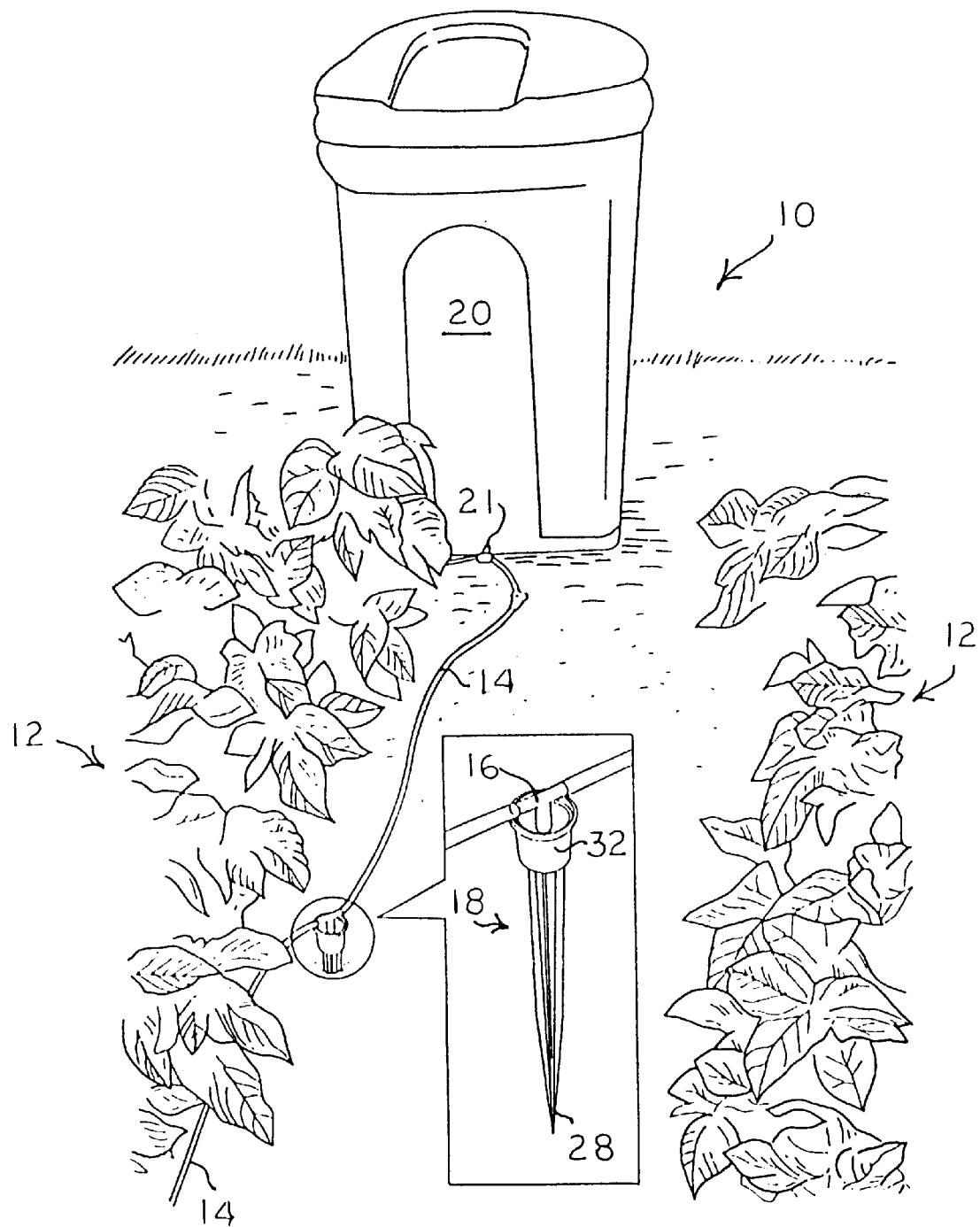
FIG. 1 is an environmental, perspective view of a first embodiment of a plant care system utilizing a central reservoir according to the present invention.
Figure 2:
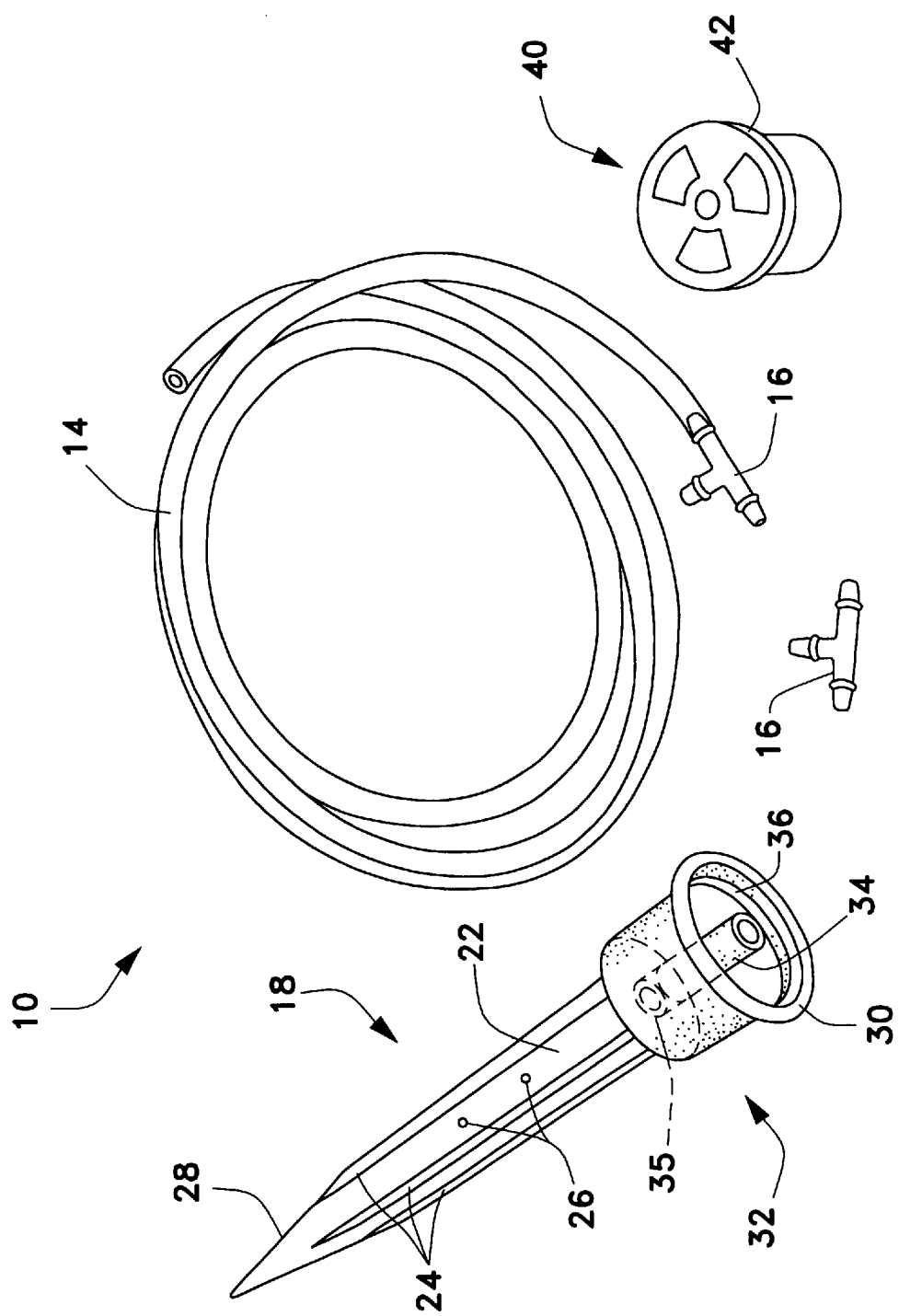
FIG. 2 is a perspective view of a kit of the first embodiment containing a feeding spike, a tubular line, a cap, tee connectors, and a reservoir.

The present invention is directed to two economical embodiments of a plant root feeding system. The first embodiment 10 is illustrated in FIGS. 1 and 2, and is a system for distribution of aqueous solutions to columns of plants 12 by plastic conduits 14 and a plastic tee connection 16 to a representative metal or plastic spike element 18 fed by gravity feed from a reservoir container 20, e.g., a 40 gallon capacity garbage pail with a drain valve 21, or other water source such as gray water, rain water, air conditioning run-off water, pond water, and a main water source. The plastic conduits 14, e.g., ⅛ in. diameter, and tee connections 16 are joined by adhesive.

In FIG. 2, a spike element 18 is shown enlarged to show a cylindrical center portion 22 having four longitudinal flanges 24 spaced equidistantly at 90° from each other. The flanges 24 separate a set of two apertures 26 to total 8 apertures on a spike element 18 for effluent flow. It should be noted that the apertures 26 are positioned at a midpoint between the conical tip portion 28 and the upper horizontal flange portion 30.

A plastic cylindrical cup portion 32 having a centered upright metal conduit 34 ending in a peripherally notched plastic nipple portion (35) frictionally engages the cylindrical center portion 22 of the spike element 18 and is removable. An inner shoulder 36 is provided in the cup portion 32 to seat the bottle cap 38 of the second embodiment shown in FIG. 5. A drain hole 39 is provided in bottom of the cup portion 32.

Figure 4:
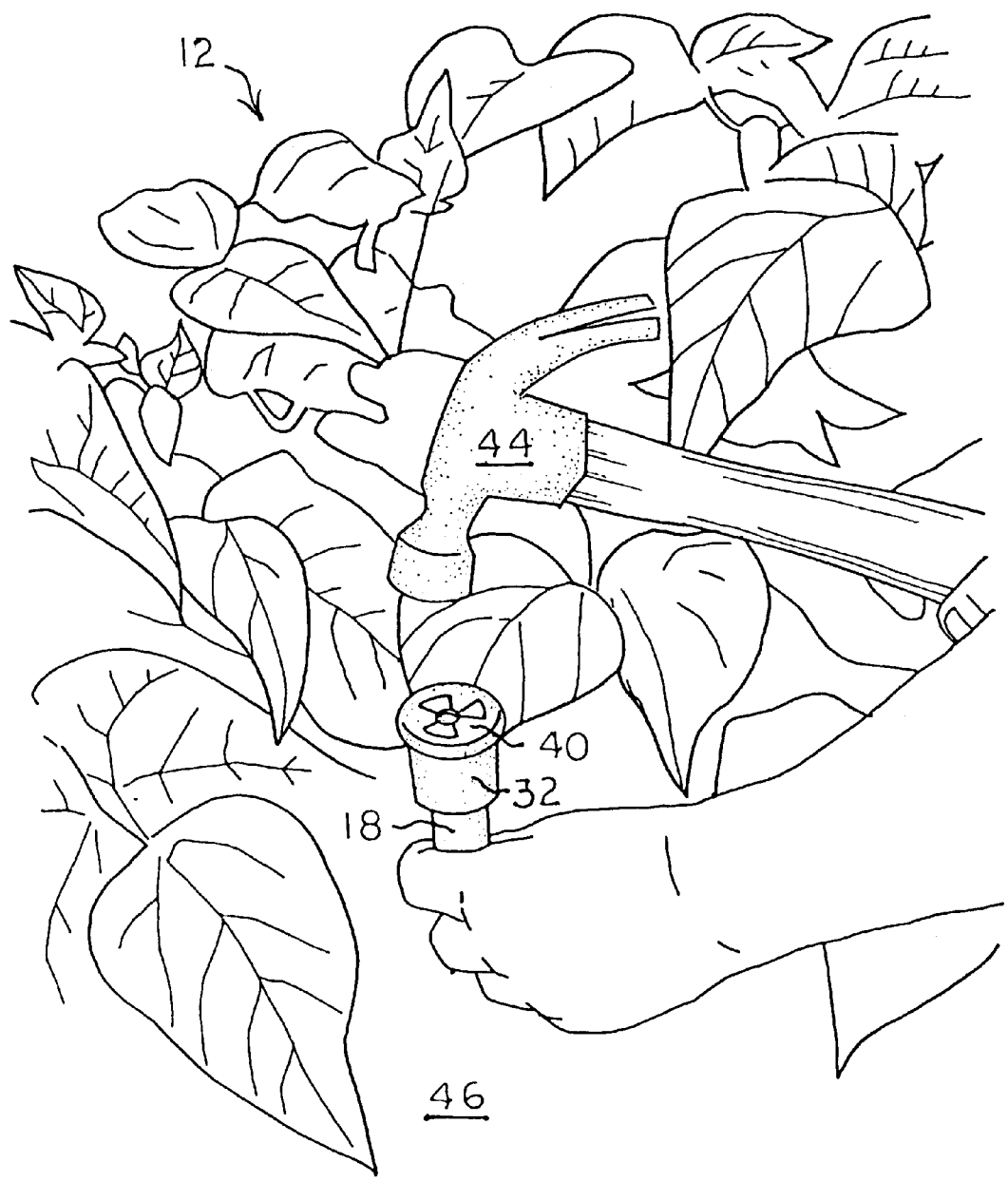
FIG. 4 is an environmental, perspective view of a feeding spike installation method utilizing an included tapper in the kit.

A removable cylindrical tapper element 40 is depicted in FIGS. 2 and 4 for insertion in the cup portion 32. Tapper element 40 fits snugly within cup portion 32, and is held securely by the inner shoulder 36 of the cup by its peripheral flange 42. A hammer 44 can then be utilized to force the spike element 18 into the soil 46.

Figure 3:
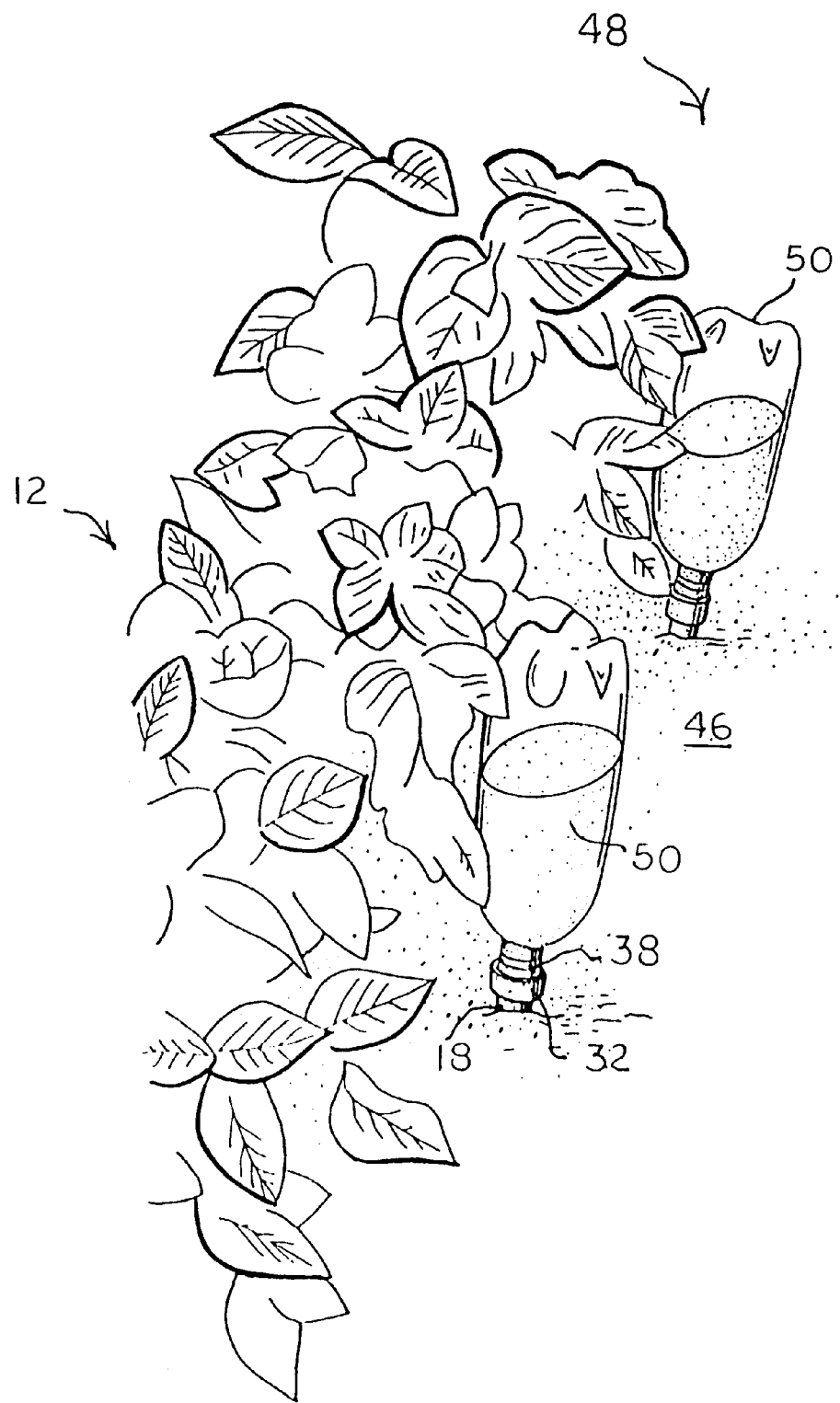
FIG. 3 is a an environmental, perspective view of a second embodiment comprising at least two representative water bottles installed on feeding spikes.

Turning to FIG. 3, the second embodiment 48 of the invention is illustrated to show the economy of using individual bottles 50 which are conventional plastic beverage containers having a capacity of 20 liquid ounces, 2 liters, etc. The bottles 50 filled with water or aqueous solutions of a fertilizer or pesticide (for fire ants, ground hornets and moles) are capped with the specialized bottle caps 38 with ribbed sides 37 and inserted into the cup portions 32 on the spike elements 18.

In FIG. 4, the tapper element 40 is inserted in the cup portion 32 and the spike element 18 is driven into the ground or soil 46 by a hammer 44 or the like driver up to the level of the bottom of the cup portion 32.

Figure 5:
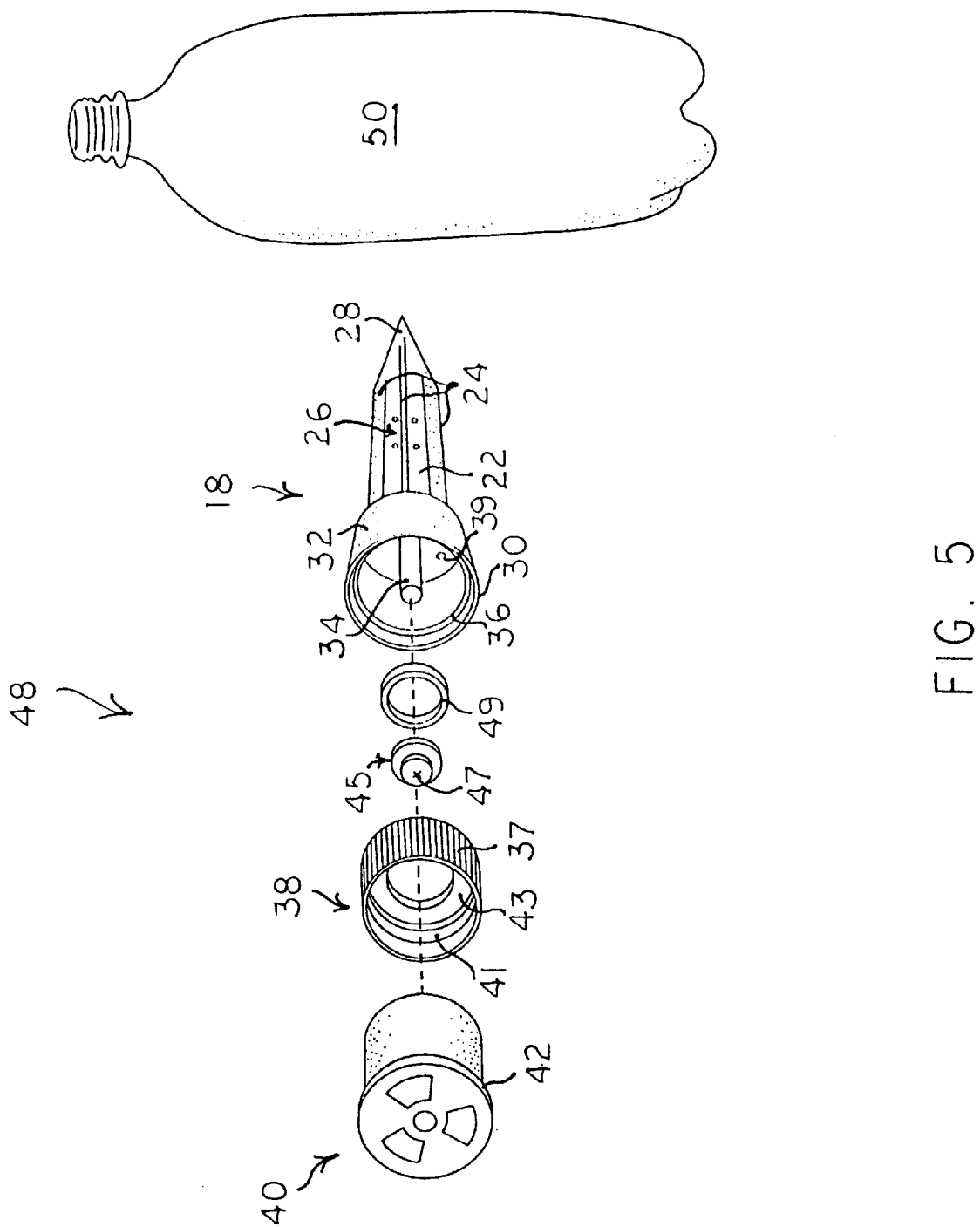
FIG. 5 is a perspective view of a feeding spike, valved cap and a tapper.

In FIG. 5, the second embodiment 48 is illustrated in an exploded configuration with the tapper element 40 to be inserted in the innovative bottle cap 38. The cap 38 has internal threading 41 and an internal shoulder 43 which secures a flexible plastic valve 45 having a slotted opening 47 with two perpendicular slots. A plastic ring 49 maintains the valve 45 on the shoulder 43. The water filled bottle 50 is then covered by cap 38 and inserted in the cup portion 32 of the spike element 18.

Thus, home gardeners, commercial gardeners, farmers and the like can protect their plants, crops, bushes, and trees by economic and timely water feeding by apportioning their water distribution with solutions even containing pesticides and fertilizer. If a weedy area is to be treated, a herbicide solution can be utilized over a longer period of time.

It is to be understood that the present invention is not limited to the embodiments described above, but encompasses any and all embodiments within the scope of the following claims.

I claim:

1. A versatile combination plant care system having a liquid supply container lacking an air vent, said plant care system comprising:

a spike element comprising a cylindrical center portion having four longitudinal extending flanges spaced equidistantly thereabout, a plurality of apertures in said cylindrical center portion, an upper horizontal flange portion having a central orifice and a small peripheral aperture, and a conical tip portion;

a cylindrical cup portion having a centered upright conduit ending in a peripherally notched nipple portion for frictional insertion in the cylindrical center portion of the spike element;

a combination apertured and internally threaded bottle cap and flexible valve element having slits for capturing the upright conduit of said cylindrical cup portion, and a conventional soft beverage bottle lacking an air vent and having an externally threaded neck for connection with said bottle cap; and a quantified aqueous supply source in said conventional soft beverage bottle connected to the upright conduit for a regulated aqueous supply to multiple plants' root systems.

2. The combination plant care system according to claim 1, including a removable cylindrical tapper element having a centered throughbore for accommodating the upright conduit in the cylindrical cup portion and being durable to withstand repeated hammerings for insertion of the spike element into the soil, and thus protecting the spike element and cup portion.

3. The combination plant care system according to claim 1, wherein the bottle cap has ribs on its external sides for gripping, and on its top surface two peripheral grooves for capturing said flexible valve element.

4. The combination plant care system according to claim 1, wherein said flexible valve element comprises a circular plastic valve portion having a protruding center with two perpendicular intersecting slits, and a locking washer for holding said valve portion in place.

5. The combination plant care system according to claim 1, wherein an upright portion of a tee connector element is connected to the upright conduit, and the two horizontal portions are connected to a supply conduit which is connected to the quantified aqueous supply source, which is a 40 gallon capacity garbage pail.

6. The combination plant care system according to claim 5, wherein a predetermined number of spike elements are provided, and connected in rows and columns beside plants.

7. The combination plant care system according to claim 1, wherein the plurality of apertures in said cylindrical center portion of the spike element are limited to two apertures per space between said longitudinal flanges.

\* \* \* \* \*